(12) United States Patent
Burns et al.

(10) Patent No.: US 9,043,478 B2
(45) Date of Patent: May 26, 2015

(54) METHODS AND APPARATUS FOR USING A DISTRIBUTED MESSAGE BUS FOR AD HOC PEER-TO-PEER CONNECTIVITY

(75) Inventors: Gregory Burns, Seattle, WA (US); Jack H. Profit, Seattle, WA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 617 days.

(21) Appl. No.: 12/900,178

(22) Filed: Oct. 7, 2010

(65) Prior Publication Data

US 2011/0145423 A1  Jun. 16, 2011

Related U.S. Application Data

(60) Provisional application No. 61/286,585, filed on Dec. 15, 2009.

(51) Int. Cl.
| | |
|---|---|
| G06F 15/16 | (2006.01) |
| H04L 29/06 | (2006.01) |
| H04W 80/06 | (2009.01) |
| H04W 84/18 | (2009.01) |

(52) U.S. Cl.
CPC .............. *H04L 69/18* (2013.01); *H04L 69/165* (2013.01); *H04W 80/06* (2013.01); *H04W 84/18* (2013.01); *H04L 69/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,725,311 | B1 * | 4/2004 | Joy et al. ....................... | 710/305 |
| 2003/0137948 | A1 * | 7/2003 | Komandur et al. ........... | 370/315 |
| 2009/0271639 | A1 * | 10/2009 | Burge et al. ................... | 713/300 |
| 2009/0300392 | A1 * | 12/2009 | Henderson et al. ........... | 713/323 |
| 2010/0291884 | A1 * | 11/2010 | Hu et al. ....................... | 455/101 |
| 2011/0019156 | A1 * | 1/2011 | Chang et al. .................. | 353/31 |

FOREIGN PATENT DOCUMENTS

| | | |
|---|---|---|
| CN | 101207621 A | 6/2008 |
| CN | 101237264 A | 8/2008 |
| JP | 2003086233 A | 3/2003 |
| JP | 2003124862 A | 4/2003 |
| JP | 2006510124 A | 3/2006 |
| JP | 2007142543 A | 6/2007 |
| JP | 2008502233 A | 1/2008 |
| WO | 2005036795 A2 | 4/2005 |

OTHER PUBLICATIONS

International Search Report, PCT/US2010/056035. International Search Authority—European Patent Office. Feb. 17, 2011.

(Continued)

*Primary Examiner* — Philip Chea
*Assistant Examiner* — Van Kim T Nguyen
(74) *Attorney, Agent, or Firm* — Neugeboren O'Dowd PC

(57) ABSTRACT

A method and apparatus for using an ad hoc peer-to-peer distributed message bus is provided. The method may include determining, by a local bus node, using a first power level communication protocol, that a remote bus node is available, obtaining, by the local bus node, connection information from the remote bus node using a second power level communication protocol, wherein the connection information comprises connection information for one or more remote endpoints associated with the remote bus node, and generating one or more local virtual endpoints, wherein each of the one or more local virtual endpoints corresponds to each of the one or more remote endpoints, and wherein the remote endpoint is described with reference to a well-known name, unique to the remote endpoint.

35 Claims, 7 Drawing Sheets

(56) References Cited

OTHER PUBLICATIONS

Written Opinion of the International Seaching Authority, PCT/US2010/056035. International Search Authority—European Patent Office. Feb. 17, 2011.

Wright, J. et al: "A dynamic infrastructure for interconnecting disparate ISR/ISTAR assets (the ITA sensor fabric)." Information Fusion. 2009. Fusion '09. 12th International Conference on, IEEE, Piscataway, NJ, USA, Jul. 6, 2009, pp. 1393-1400, XP031512046.
Translation of Notice of Grounds for Rejection Dated Sep. 5, 2013 From the Korean Intellectual Property Office, Patent Application No. 2012-7018442.

\* cited by examiner

METHODS AND APPARATUS FOR USING A DISTRIBUTED MESSAGE BUS FOR AD HOC PEER-TO-PEER CONNECTIVITY

CROSS-REFERENCE TO RELATED APPLICATION(S)

The present application for patent claims priority to Provisional Application No. 61/286,585, entitled "METHODS AND APPARATUS FOR USING A DISTRIBUTED MESSAGE BUS FOR AD HOC PEER-TO-PEER CONNECTIVITY," filed Dec. 15, 2009, the contents of which are expressly incorporated by reference herein.

BACKGROUND

1. Field of the Invention

The present disclosure relates generally to communications between multiple devices, and more particularly to using an ad hoc peer-to-peer distributed message bus that uses connections established through wireless or wired protocols, singularly or in combination, to enable applications, or the like, running of various devices to share contextual, application-specific and generic system information, such as location, motion, connection status, battery level, radio signal strength, inputted events, etc.

2. Relevant Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs.

Still further, users of such device are interested in using the device to access: other devices, web based content, services, etc. Currently, devices may communicate through limited peer-to-peer connections, where such connections are limited by connection technology and rigid connection protocols. For example, current technologies such as Bluetooth, WiFi, etc., provide little support for application developers looking to enable peer-to-peer (P2P) communication between applications running on different devices (e.g., handsets, laptops, desktops, etc.) and/or different operating systems. Further, currently mobile platforms may not expose APIs that provide application developers with support to develop the above mentioned P2P applications, and some platforms that do expose APIs often are available to only those developers with extensive expertise and knowledge of any underlying networks and protocols.

Thus, improved apparatus and methods for providing cross-platform, language independent solutions for enabling ad hoc P2P communication between applications without extensive expertise and knowledge of underlying networks and protocols are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in using an ad hoc peer-to-peer distributed message bus. According to one aspect, a method for using an ad hoc peer-to-peer distributed message bus is provided. The method can comprise determining, by a local bus node, using a first power level communication protocol, that a remote bus node is available. Further, the method can comprise obtaining, by the local bus node, connection information from the remote bus node using a second power level communication protocol, wherein the connection information comprises connection information for one or more remote endpoints associated with the remote bus node. Moreover, the method can comprise generating one or more local virtual endpoints, wherein each of the one or more local virtual endpoints corresponds to each of the one or more remote endpoints, and wherein the remote endpoint is described with reference to a well-known name, unique to the remote endpoint.

Another aspect relates to a computer program product comprising a computer-readable medium. The computer-readable medium comprises code executable to determine, by a local bus node, using a first power level communication protocol, that a remote bus node is available. Further, the computer-readable medium comprises code executable to obtain, by the local bus node, connection information from the remote bus node using a second power level communication protocol, wherein the connection information comprises connection information for one or more remote endpoints associated with the remote bus node. Moreover, the computer-readable medium comprises code executable to generate one or more local virtual endpoints, wherein each of the one or more local virtual endpoints corresponds to each of the one or more remote endpoints, and wherein the remote endpoint is described with reference to a well-known name, unique to the remote endpoint.

Yet another aspect relates to an apparatus. The apparatus can comprise means for determining, by a local bus node, using a first power level communication protocol, that a remote bus node is available. Further, the apparatus can comprise means for obtaining, by the local bus node, connection information from the remote bus node using a second power level communication protocol, wherein the connection information comprises connection information for one or more remote endpoints associated with the remote bus node. Moreover, the apparatus can comprise means for generating one or more local virtual endpoints, wherein each of the one or more local virtual endpoints corresponds to each of the one or more remote endpoints, and wherein the remote endpoint is described with reference to a well-known name, unique to the remote endpoint.

Another aspect relates to an apparatus. The apparatus can include a communication module operable for: determining, by a local bus node, using a first power level communication protocol, that a remote bus node is available, obtaining, by the local bus node, connection information from the remote bus node using a second power level communication protocol, wherein the connection information comprises connection information for one or more remote endpoints associated with the remote bus node, and generating one or more local virtual endpoints, wherein each of the one or more local virtual endpoints corresponds to each of the one or more remote endpoints, and wherein the remote endpoint is described with reference to a well-known name, unique to the remote endpoint.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
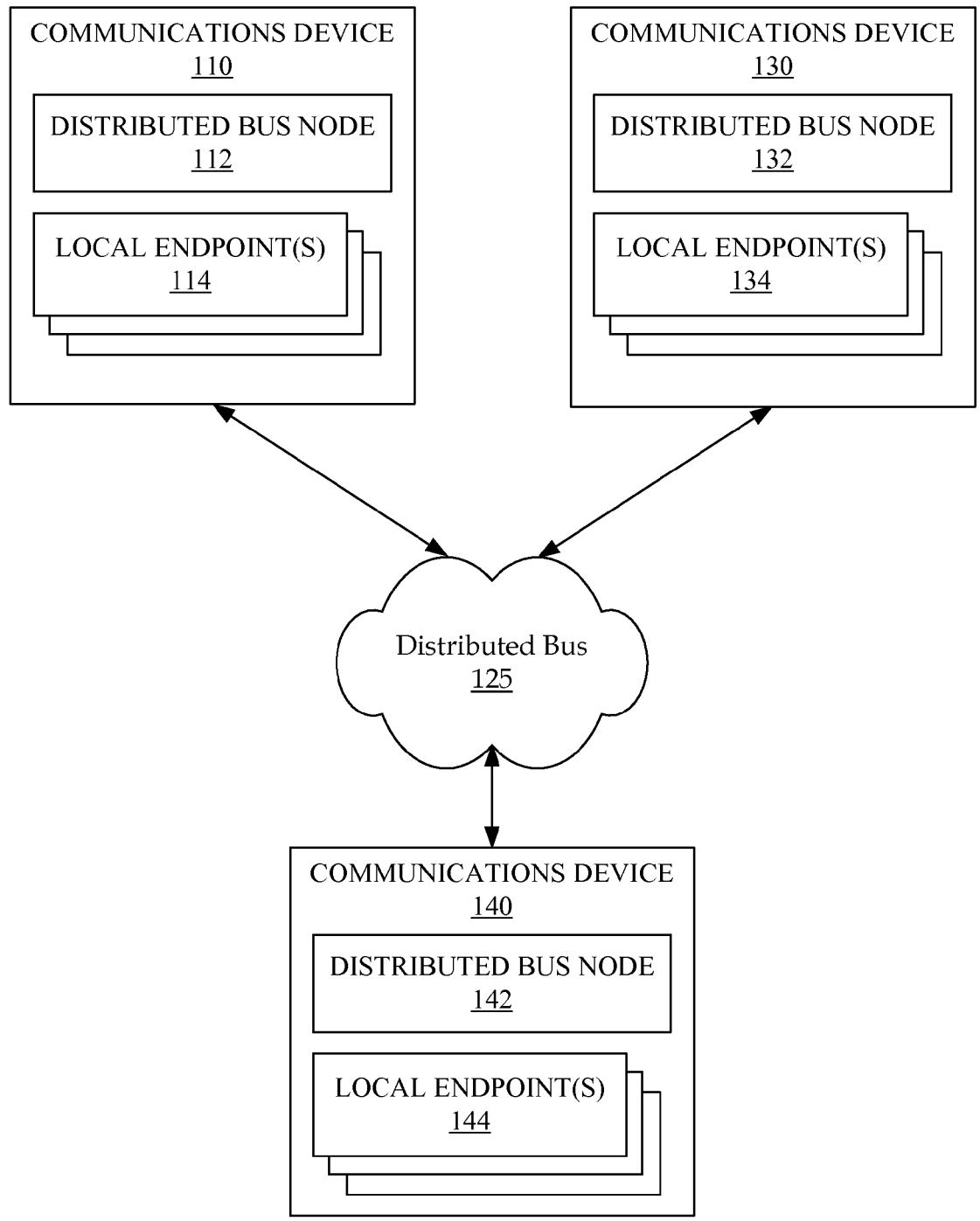
FIG. 1 illustrates a block diagram of a communication network according to an aspect.

Various aspects are now described with reference to the drawings. In the following description, for purposes of explanation, numerous specific details are set forth in order to provide a thorough understanding of one or more aspects. It may be evident however, that such aspect(s) may be practiced without these specific details.

Generally, communications between applications and the like, on a single platform may be facilitated using an inter-process communication protocol (IPC) framework such as DBus found on Linux and other operating systems. DBus includes a software bus used to enable application-to-application communications in a desktop environment where applications register with the bus to offer services to other applications and other applications query the bus for information about registered applications. Such a protocol may provide asynchronous notifications and remote procedure calls (RPCs). In other words, signal messages (e.g., notifications) may be point to point or broadcast, method call messages (e.g., RPC's) may be synchronous or asynchronous, and a bus (e.g., "daemon" bus) process may handle message routing. Further, the DBus framework is language neutral, (e.g., specified as a wire-protocol rather than APIs). Further, generally, there are two types of bus daemons used in a DBus protocol: a system bus for communication with the HAL and system components, and a session bus for communication between desktop applications during a login session. The system bus may be launched at boot-time of a device, may connect applications to sockets (e.g., UNIX sockets), may provide security at the socket level using credentials, may provide notification of hardware being plugged in and/or unplugged, and may provide support queries about hardware capabilities and/or states. The session bus may be launched at a login-time for a user, and may connect applications over TCP/IP or UNIX sockets and may provide security mechanisms when applications connect to the bus. Further, names and identifiers are ASCII strings defined using various naming conventions, with each bus being allocated a unique name, and applications registering their own well known names. Still further, application functionality may be exposed through one or more objects with object paths being named using prefixes based on object names.

As used herein an object may implement one or more interfaces, where an interface may encapsulate related method and signal messages, and where an object can be queried to obtain names of interfaces it may implement. Further, interface names, like object paths, may describe specific and/or generic functionalities, such as "get," "ping," etc. Further, as used herein, a member name may describe simple names for method and/or signal messages. In one aspect, an interface may include one or more members. Still further, as used herein, error names may provide namespaces for errors and are similar to interface names.

Turning now to DBus messages, such messages may be strongly typed and may comprise a header and a body, where the type signature for the header may be predefined. The header may include multiple fields, such as, message type (e.g., method call, method return, signal, or error), sender (e.g., a unique name allocated by a message bus), destination, object path, and signature. The body may include message arguments. Further, a signature ASCII string may define data types for message data. For example, types can be basic types, such as integers, or composite types, such as structures, arrays, and dictionaries. Still further, for and ease and speed of marshaling data is zero padded to align on natural boundaries for the type being marshaled. Basic signature types may include 8, 16, 32 and 64 bit signed and unsigned integers, doubles (e.g., 64-bit floating point), strings, etc. Further, composite types may be built from basic types and from other composite types. Yet further, a variant type signature may allow for run-time typing. Table 1 provides examples of various signatures.

TABLE 1

| | Signature Examples |
|---|---|
| ii | A pair of signed 32 bit integers |
| ts | A 64 bit unsigned integer followed by a string |
| (nnd) | A structure consisting of a pair of 16 bit signed integers and double |
| au | An array of unsigned 32 bit integers |
| ay | An array of bytes (unsigned 8 bit integers) |
| a(is) | An array of structures, each structure has a 32 bit integer and a string |
| v | A variant, the value is marshaled along with its own signature |
| a{s(si)} | An array of dictionary entries where the key for each entry is a string and the value is a structure containing a string and an integer |
| aai | A two-dimensional array of integers (array of integers) |

Further, applications or the like may attempt to communicate with each other either within a single device, or between multiple devices. Within a single device, applications may use a message bus (MBus) protocol to facilitate communications. Such an MBus protocol may provide extended functionality and improved performance over a DBus based protocol. For example, MBus protocol based communications may allow for flexible bus topologies (e.g., not just a DBus star topology), bus to bus functionality, and point-to-point authentication and/or encryption. Further, MBus protocol based communications may allow for wireless and on-processor connectivity, (e.g., local UNIX sockets, shared memory, Bluetooth, TCP/IP) user may attempt to retrieve content accessible from a web server 140 from a device 110. In one aspect, a device 110 may include: a wireless communications device (WCD), multiple devices, both wireline and wireless. For example, multiple devices may work in tandem, as a network, etc. In such an instance, the device 110 may obtain the requested primary content item, e.g., a main web page, for access by the user. Additionally, device 110 may communicate with a proxy server 130 to obtain secondary content items associated with the primary content item, e.g., a web page, object, etc., linked to the primary content item, prior to the user requesting such secondary content items. Retrieval of these secondary content items may be performed using a specific protocol. The specific protocol, hereinafter referred to as a second protocol, reduces the round trip time of a series of content item requests and corresponding acknowledgements by allowing the requests to be decoupled from any associated acknowledgement of a prior request. As such, using the second protocol, a plurality of requests may be sent over a single connection path unencumbered by any delays associated with waiting for a receipt acknowledgement response from a prior request.

With reference to FIG. 1, a block diagram of a communication network 100 according to an aspect is illustrated. Communication network 100 may include communications devices 110, 130, 140 connected through a distributed bus 125. In one aspect, distributed bus 125 may be supported by a variety of transport protocols, e.g., Bluetooth, TCP/IP, WiFi, a CDMA network, a GPRS network, a UMTS network, and other types of communication protocols. In another aspect, communications device 110 may include distributed bus node 112 and one or more local endpoints 114. Distributed bus node may facilitate communications between local endpoints 114 associated with communications device 110, and other local end points (134, 144) associated with other communications devices 130, 140 accessible through distributed bus 125. As used herein, a distributed bus may support symmetric multi-device network topologies and may provide a robust operation in the presence of device drops-outs. Further description of connection and communication processes associated with distributed bus 125 is provided with reference to FIG. 2.

As such, a virtual distributed bus 125, which is independent of the underlying transport protocol (e.g., Bluetooth, TCP/IP, WiFi, etc.), may allow a range of security options, from wide-open to authenticated and encrypted, to be used while facilitating the spontaneous connections with devices, without any use of intervention, when the devices come into range of each other.

Figure 2:
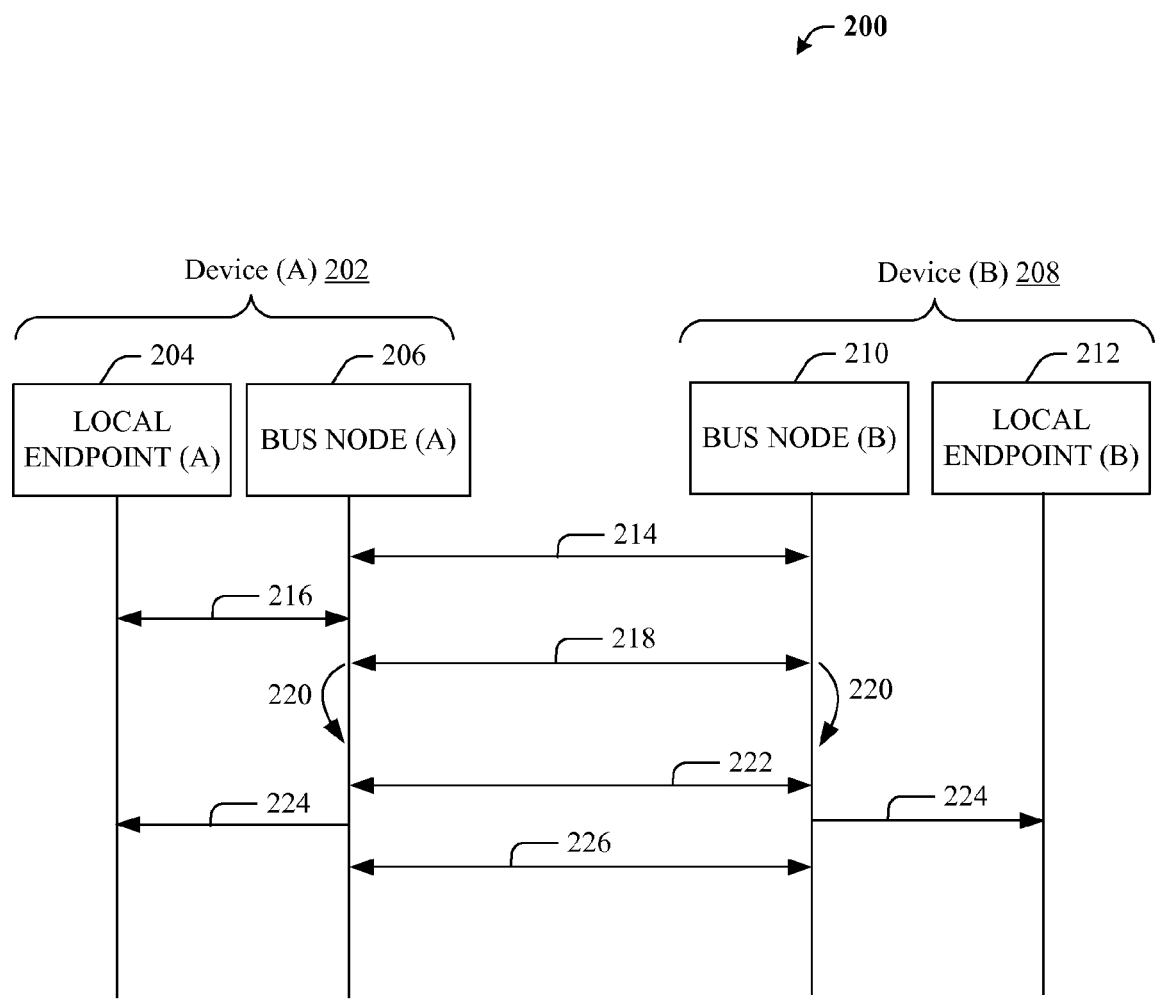
FIG. 2 illustrates a message sequence chart of operation of an aspect depicted in FIG. 1.

With reference to FIG. 2, operation of the subject matter depicted in FIG. 1 in the form of a message sequence diagram is illustrated. Generally, device (A) 202 may request to communicate with device (B) 208. In one aspect, device (A) 202 may include local endpoint (A) 204, such as a local application, service, etc., which may make a request to communicate, and bus node (A) 206 which may assist in facilitating such communications. Further, device (B) 208 may include local endpoint (B) 212 with which local endpoint (A) may be attempting to communicate, and bus node (B) 210, which may assist in facilitating communications between local endpoint (A) 204 and local endpoint (B) 212.

In one aspect, bus nodes (A) and (B) may perform discovery mechanisms, at sequence step 214. For example, mechanisms for discovering connections supported by Bluetooth, TCP/IP, UNIX or the like may be used. At sequence step 216, local endpoint (A) 204 may request to connect to an entity, service, endpoint etc, available through bus node (A) 206. In one aspect, such a request may include a request and response process between local endpoint (A) 204 and bus node (A) 206. At sequence step 218, a MBus server (e.g., bus node (A) 206) may connect to one or more other MBus servers (e.g., bus node (B) 210). In one aspect, communications may be facilitated using a protocol such as MBus the DBus wire-protocol, or other IPC mechanisms, etc. For example, MBus based endpoints may connect with another server through a DBus based protocol. In another aspect, bus node (A) 206 may authenticate connections with other MBus servers using mechanisms, such as available to DBus based endpoints and servers, (e.g., SASL). With SASL authentication, a client may send an authentication command to initiate an authentication conversation. The authentication command may list a client's authentication mechanisms. A server may reject an authentication command and may list its own authentication mechanisms. A client may choose an authentication mechanism at a start of the conversation. Further, authentication proceeds may be a series of challenges and responses. If authentication fails a client may either try another mechanism or disconnect. After successful authentication, a client may send a Hello method call message. Thereafter, a method message may be returned from a server, issuing unique id to client. As such, the client may have a sender id and may perform other method message calls.

As used herein, MBus may be an extension of DBus protocols that may allow disjointed multi-endpoint MBus instance to join together to form a single instance. In one aspect, such an instance may be supported using a non-star based topology. Further, MBus server (bus nodes) may allow MBus messages to flow directly to other destinations, without limitations associated with underlying transport mechanisms) and without being forwarded to a central router. Further, MBus enabled devices may facilitate communications between non-MBus enabled devices.

Further, such connections may be authenticated in both directions. In other words, authentication commands and responses may be exchanged in both directions. Still further, during sequence step 218, bus nodes (A) and (B) may exchange information about other available endpoints. In such an aspect, each endpoint maintained by a bus node may be described to other bus nodes, where such description may include unique endpoint names, transport types, connection parameters, etc.

Still further, bus nodes may facilitate various security mechanisms. For example, an application may authenticate with the bus node. The authentication may be negotiated at a contact time. The authentication may follow the SASL model described above. Further, the bus node may provide for built-in authentication mechanisms, such as, an "anonymous" field for no authentication, a "cookie" field for user authentication based on file system access rights, an "external" field for user authentication using a kernel socket security, etc.

At sequence step 220, each bus node (e.g., bus node (A) 206 and bus node (B) 210) may use obtained endpoint information to create virtual endpoints that may represent the real obtained endpoints available through various bus nodes. In one aspect, message routing on the bus node (A) 206 may use real and virtual endpoints to deliver messages. Further, there may one local virtual endpoint for every endpoint that exists on remote devices (e.g., device (B) 208). Still further, such virtual endpoints may multiplex and/or de-multiplex messages sent over a MBus connection (e.g., a connection between bus node (A) 206 and bus node (B) 210). In one aspect, virtual endpoints may receive messages from the local bus node, just like real endpoints, and may forward messages to the MBus connection associated with the endpoint. In such an aspect, virtual endpoints may forward messages to the local bus node from the endpoint multiplexed MBus connection. Still further, in another aspect, virtual endpoints that correspond to virtual endpoints on a remote device may be reconnected at any time to accommodate desired topologies of specific transport types. In such an aspect, UNIX based virtual endpoints may be considered local and as such may not be considered candidates for reconnection. Further, TCP based virtual endpoints may be optimized for one hop routing to a desired MBus server (e.g., each MBus bus node may be directly connected to each other MBus bus node). Still further, Bluetooth based virtual endpoints may be optimized for a single pico-net (e.g., one master and n slaves). In such an aspect, the Bluetooth based master may be the same bus node as a local MBus master node.

At sequence step 222, MBus based servers (e.g., bus node (A) 206 and bus node (B) 210) may exchange bus state information so as to merge bus instances. In one aspect, state information may consist of a well-known unique endpoint name map, match rules and routing groups. In one aspect, state information may be communicated between MBus server instances using a MBus based interface with local endpoints communicated with using a DBus based local name. In another aspect, each MBus server (e.g., bus node (A) 206) may maintain its own bus controller responsible for DBus based feedback. In such an aspect, a bus controller may translate global MBus methods and signals into the standard local DBus methods and signals.

At sequence step 224, MBus based servers (e.g., bus node (A) 206 and bus node (B) 210) may communicate (e.g., broadcast) signals to inform local endpoints (e.g., local endpoint (A) 204, local endpoint (B) 212, etc.) of changes introduced during bus node connections, such as described above. In one aspect, new and/or removed global and/or translated names may be indicated with name owner changed signals. Further, global names that may be lost (locally), due to name collisions, may be indicated with name lost signals. Still further, global names that are transferred due to name collisions may be indicated with name owner changed signals. Yet further, unique names that disappear when two busses become disconnected may be indicated with name owner changed signals.

As used above, well-known names may be used to uniquely describe local endpoints. In one aspect, when communications occur between multiple devices, different types of well known names may be used. For example, a device local name may exist only on the bus node of a specific device to which it is directly attached. In another example, a global name may exist on all known bus nodes, where only one owner of the name may exist on all bus segments. In other words, when busses are joined and collisions occur, one of the owners may lose the global name. In still another example, a translated name may be used when a client is connected to other bus nodes associated with a virtual bus. In such an aspect, the translated name may include an appended end (e.g., local endpoint (A) with well-known name org.foo may be connected to MBus server with GUID=1234 may be seen as "G1234.org.foo" by clients connected to MBus servers other than GUID=1234).

At sequence step 226, MBus based servers (e.g., bus node (A) 206 and bus node (B) 210) may communicate (e.g., broadcast) signals to inform other bus nodes of changes to endpoint bus topologies. Thereafter, traffic from endpoints (e.g., local endpoint (A) 204) may move through virtual endpoints to reach intended remove end points (e.g., local endpoint (B) 212) on remote devices (e.g., device (B) 208).

Further, in operation, communications between endpoints (e.g., local endpoint (A) 204, local endpoint (B) 212, etc.) may use routing groups. In one aspect, routing groups may enable endpoints to receive signals, method calls, etc., from a subset of endpoints. In such an aspect, a routing name may be determined by an application connected to a bus node. For example, a P2P application may use a unique, well-known routing group name built into the application. Further, bus nodes may support registering and/or de-registering of endpoints with routing groups. In one aspect, routing groups may have no persistence beyond a current bus instance. In another aspect, applications may register for their preferred routing groups each time they connect to the bus. Still further, groups may be open (e.g., any endpoint can join) or closed (e.g., only the creator of the group can modify the group). Yet further, a bus node may send signals to notify other remote bus nodes of additions, removals, etc. of endpoints to and/or from a routing group. In such an aspect, the bus node may send a routing group change signal to other group members whenever a member is added and/or removed from the group. Further, the bus node may send a routing group change signal automatically to endpoints that disconnect from the bus without first removing themselves from the routing group.

Figure 3:
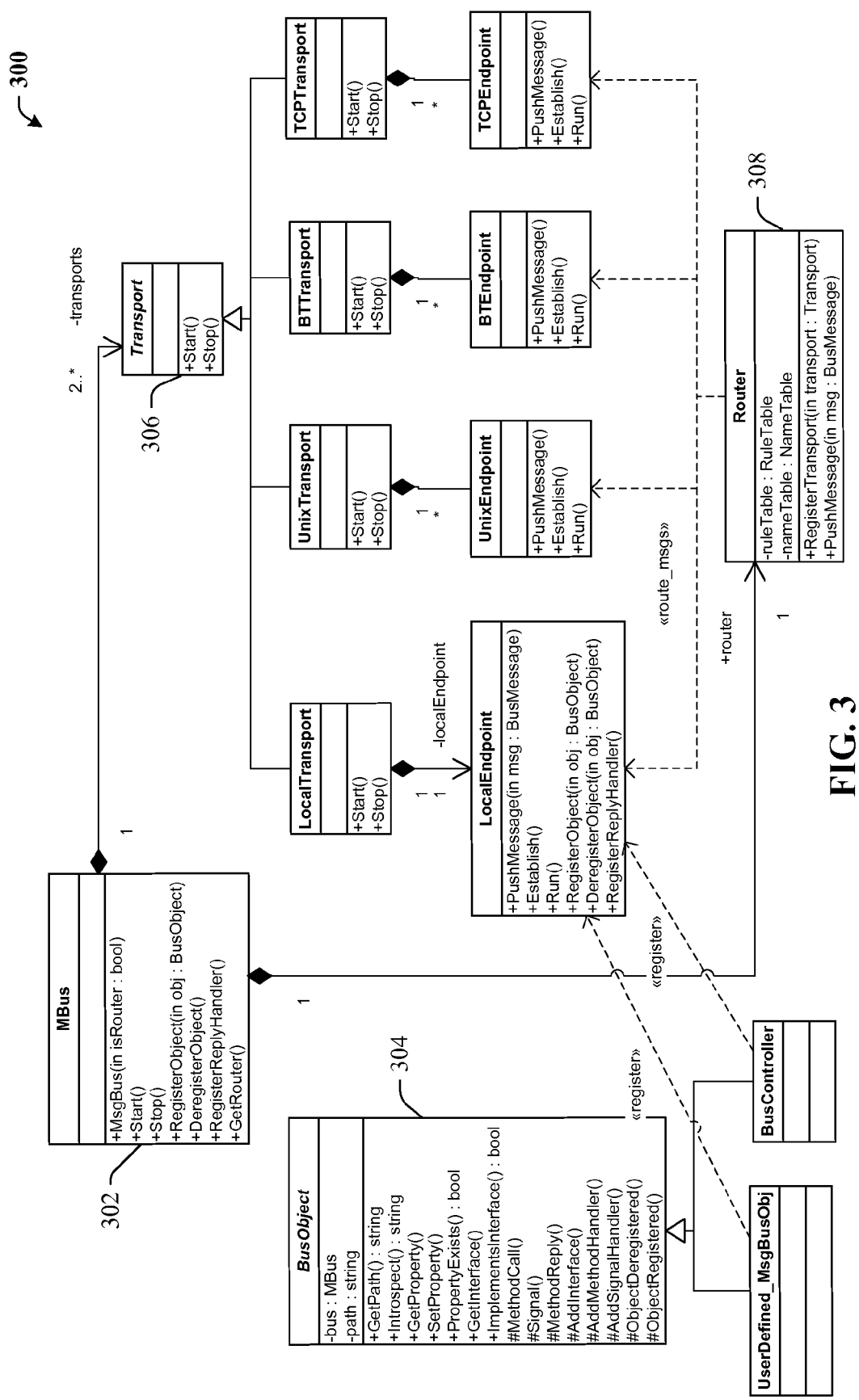
FIG. 3 illustrates a high-level object model for use in an aspect according to message sequence chart depicted in FIG. 2.

With reference to FIG. 3, an exemplary high-level object model 300 is depicted. In one aspect, the high-level object model may include a message bus (MBus) 302. As depicted, MBus 302 may be associated with MBus object 304, MBus transport 306 and MBus router 308. In one aspect, MBus transport may include various transports, such as a local transport, a UNIX transport, a Bluetooth transport, a TCP/IP transport, etc., with each transport being available for at least one associated endpoint.

In one aspect, MBus object 304 may provide for built-in functionality through predefined names, object paths, interface names, and member names. Determining such functionality may be described as introspection, where introspection provides a description (e.g., XML description) of an object's interfaces and/or nested objects. In one aspect, an interface may provide methods for name management (e.g., RequestName, ReleaseName, HasOwner, etc.), and/or route management (e.g., AddMatch, RemoveMatch, etc.).

Figure 4:
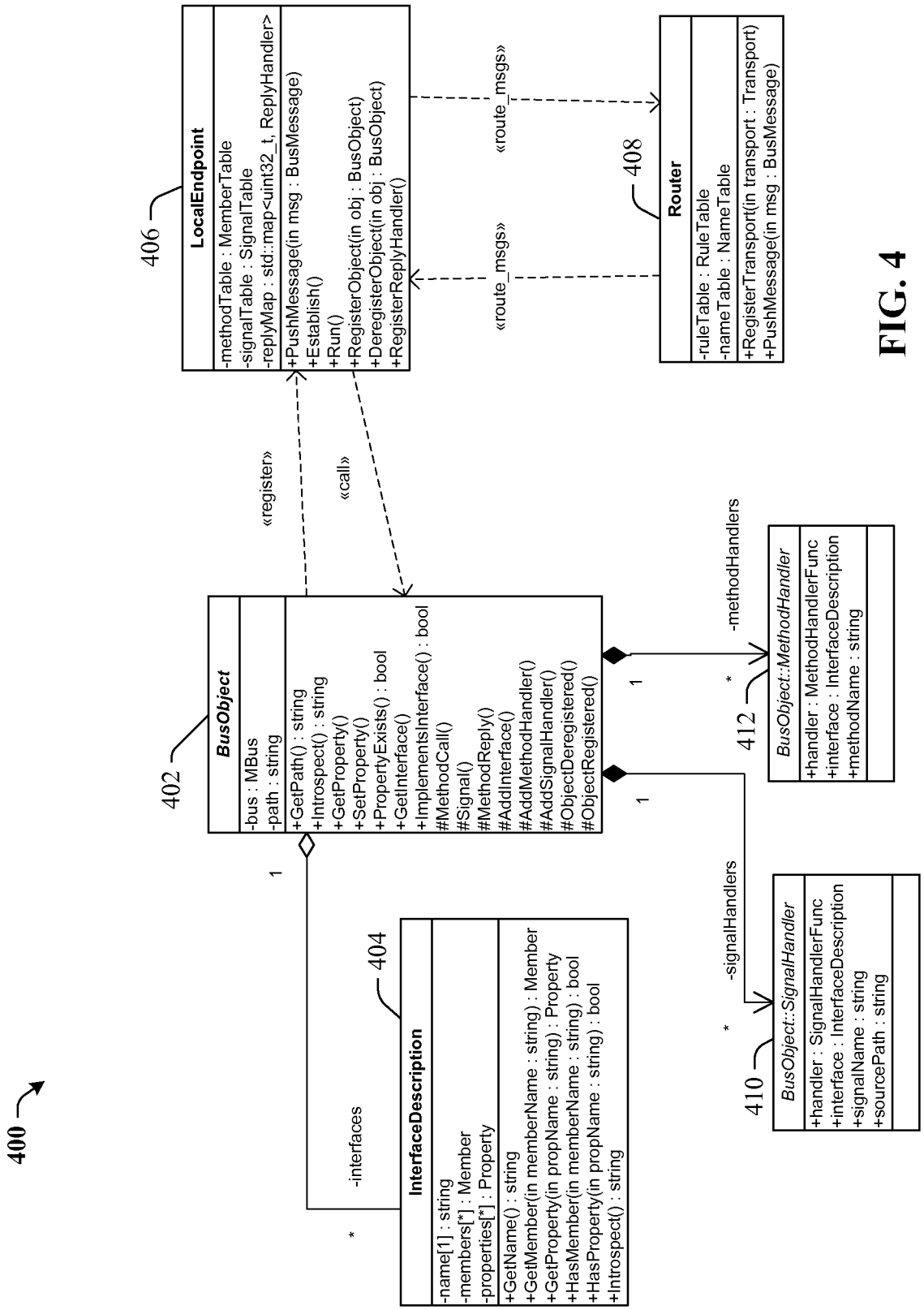
FIG. 4 illustrates another high-level object model for use in an aspect according to message sequence chart depicted in FIG. 2.

With reference to FIG. 4, another exemplary high-level object model 400 is depicted. In one aspect, high-level object model 400 may include a MBus object 402. MBus object 402 may be associated with MBus interface 404, MBus local endpoint 406 which may be associated with MBus router 408, MBus signal message handler 410 and MBus method message handler 412.

Figure 5:
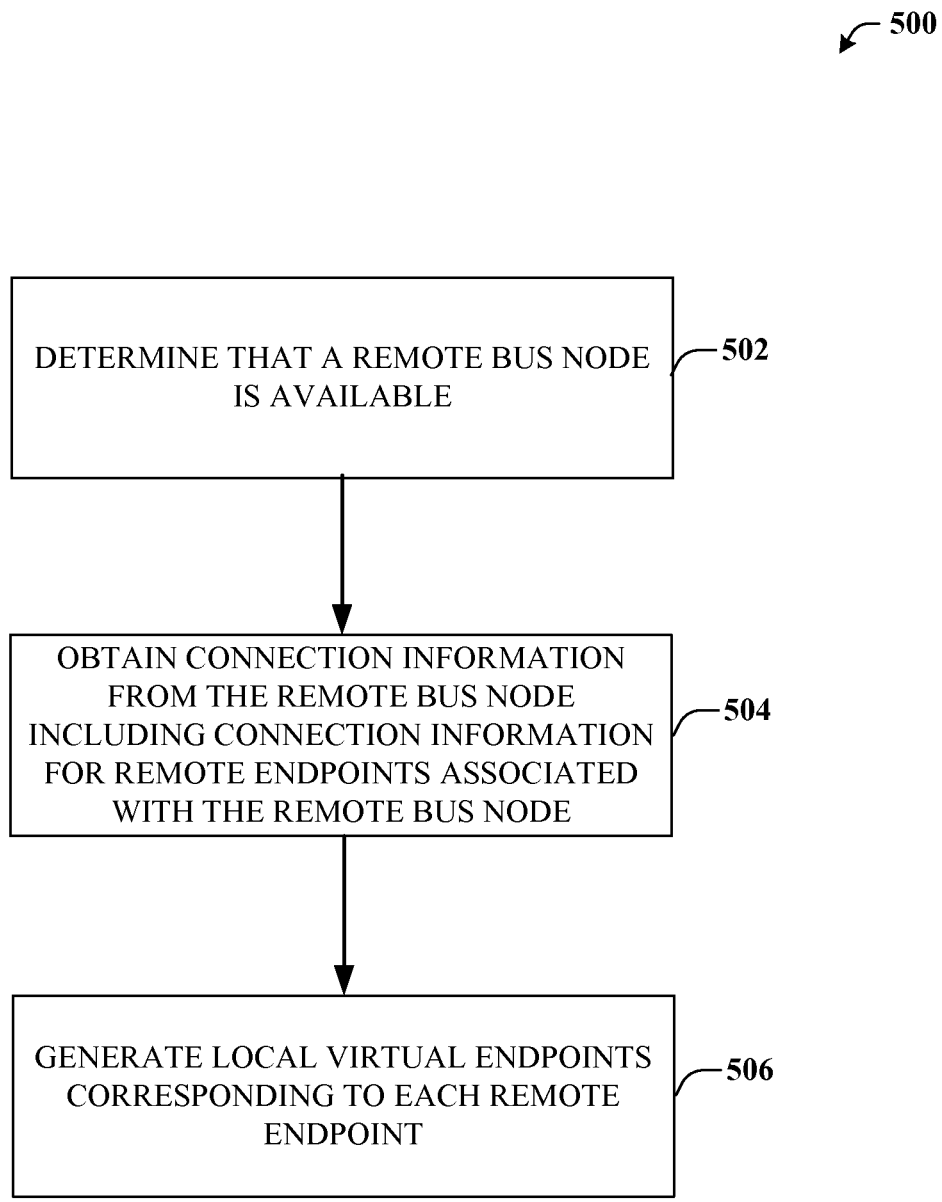
FIG. 5 illustrates a flowchart of an aspect of a communication network according to an aspect.

FIG. 5 illustrates various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 5, example method 500 for using an ad hoc peer-to-peer distributed message bus is illustrated. At reference numeral 502, a determination that a remote node may be available is made. In one aspect, the determination may be performed by a local bus node. In another aspect, the determination may be independent of any underlying transport protocol (e.g., Bluetooth, TCP/IP, WiFi, etc.), and may allow a range of security options, from wide-open to authenticated and encrypted, to be used while facilitating the spontaneous connections with devices, without any use of intervention, when the devices come into range of each other.

At reference numeral 504, connection information may be obtained from the remote bus node including connection information for remote endpoints associated with the remote bus node. In one aspect, discovery mechanisms may be used to assist in obtaining connection information. For example, mechanisms for discovering connections supported by Bluetooth, TCP/IP, UNIX domain-sockets, or the like may be used.

At reference numeral 506, a local virtual endpoint may be generated for each obtained remote endpoint. As such, through use of local virtual endpoints, a non-star based network topography may be achieved. In operation, virtual endpoints may receive messages from the local bus node, just like real endpoints, and may forward messages to the MBus connection associated with the endpoint. In such an aspect, virtual endpoints may forward messages to the local bus node from the endpoint multiplexed MBus connection. Still further, in another aspect, virtual endpoints that correspond to virtual endpoints on a remote device may be reconnected at any time to accommodate desired topologies of specific transport types. In such an aspect, UNIX based virtual endpoints may be considered local and as such may not be considered candidates for reconnection. Further, TCP based virtual endpoints may be optimized for one hop routing to a desired MBus server (e.g., each MBus bus node may be directly connected to each other MBus bus node). Still further, Bluetooth based virtual endpoints may be optimized for a single pico-net (e.g., one master and n slaves). In such an aspect, the Bluetooth based master may be the same bus node as a local MBus master node.

Still further, in one aspect, various defined message types may be used to facilitate communications between bus nodes. Such messages may be categorized into various types, such as signals, methods, etc. For example, some method type messages include: "AddToGroup," may be sent by an endpoint to add itself to a named group; "RemoveFromGroup" may be send by an endpoint to remove itself from a named group; "ConnectToBus" may be sent to attempt to connect to and join with another bus node; "RequestName" may be sent by an endpoint to request a specific type of well-known name (e.g., local, global, translated, etc.); and "GetTranslatedNames" may allow for an endpoint to receive translated well-known names for a specific base name. As further, example, some signal type messages may include: "GroupChanged" may be send to all group members to inform them of endpoints joining and/or leaving a named group; and "ConnectionChanged" may be sent to inform endpoints that bus node connection has been added and/or dropped.

Figure 6:
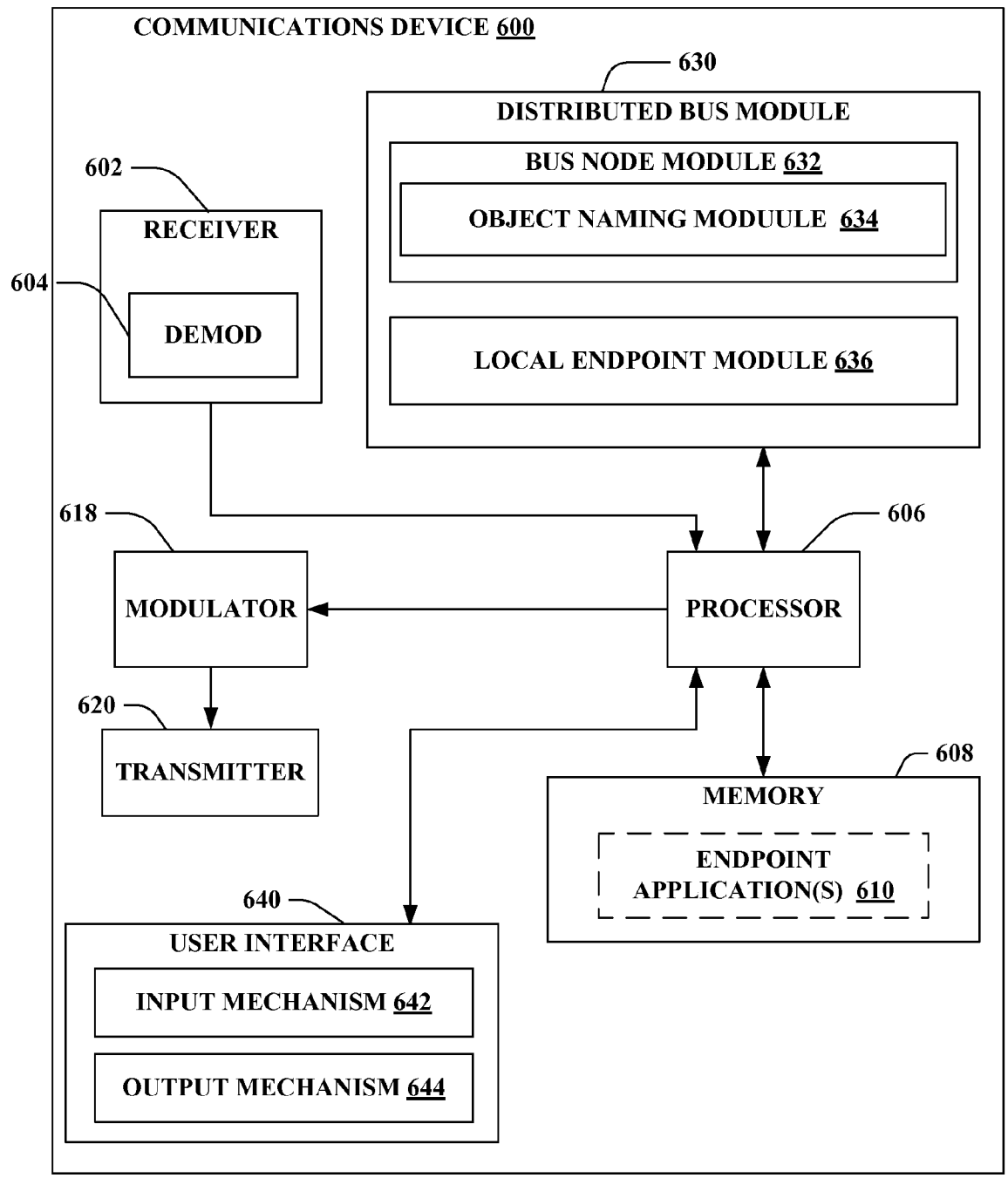
FIG. 6 illustrates a block diagram example architecture of a communications device.

While still referencing FIG. 1, but turning also now to FIG. 6, an example architecture of communications device 110 is illustrated. As depicted in FIG. 6, device 600 comprises receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to processor 606 for channel estimation. Processor 606 can be a processor dedicated to analyzing information received by receiver 602 and/or generating information for transmission by transmitter 620, a processor that controls one or more components of mobile device 600, and/or a processor that both analyzes information received by receiver 602, generates information for transmission by transmitter 620, and controls one or more components of mobile device 600.

Mobile device 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. In one aspect, memory 608 can include local endpoint applications 610, which may seek to communicate with endpoint applications, services etc., on device 600 and/or other devices associated through distributed bus module 630. Memory 608 can additionally store protocols and/or algorithms associated with estimating and/or utilizing a channel (e.g., performance based, capacity based, etc.).

Further, processor 606 can provide means for determining, by a local bus node, using a first power level communication protocol, that a remote bus node is available, means for obtaining, by the local bus node, connection information from the remote bus node using a second power level communication protocol, wherein the connection information comprises connection information for one or more remote endpoints associated with the remote bus node, and means for generating one or more local virtual endpoints, wherein each of the one or more local virtual endpoints corresponds to each of the one or more remote endpoints, and wherein the remote endpoint is described with reference to a well-known name, unique to the remote endpoint.

It will be appreciated that data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods may comprise, without being limited to, these and any other suitable types of memory.

Mobile device 600 can further include distributed bus module 630 to facilitate establishing connections with other devices, such as device 600. Distributed bus module 630 may further comprise bus node module 632 to assist distributed bus module 630 managing communications between multiple devices. In one aspect, a bus node module 632 may further include object naming module 634 to assist bus node module 632 in avoiding naming collisions with endpoint applications 610 associated with other devices. Still further, distributed bus module 630 may include endpoint module 636 to assist local endpoints in communicating with other local endpoints and/or endpoints accessible on other devices through an established distributed bus. In another aspect, distributed bus module 630 may facilitate inter-device and/or intra-device communications over multiple available transports (e.g., Bluetooth, UNIX domain-sockets, TCP/IP, WiFi, etc.)

Additionally, mobile device 600 may include user interface 640. User interface 640 may include input mechanisms 642 for generating inputs into communications device 600, and output mechanism 644 for generating information for consumption by the user of the communications device 600. For example, input mechanism 642 may include a mechanism such as a key or keyboard, a mouse, a touch-screen display, a microphone, etc. Further, for example, output mechanism 644 may include a display, an audio speaker, a haptic feedback mechanism, a Personal Area Network (PAN) transceiver etc. In the illustrated aspects, the output mechanism 644 may include a display operable to present media content that is in image or video format or an audio speaker to present media content that is in an audio format.

Figure 7:
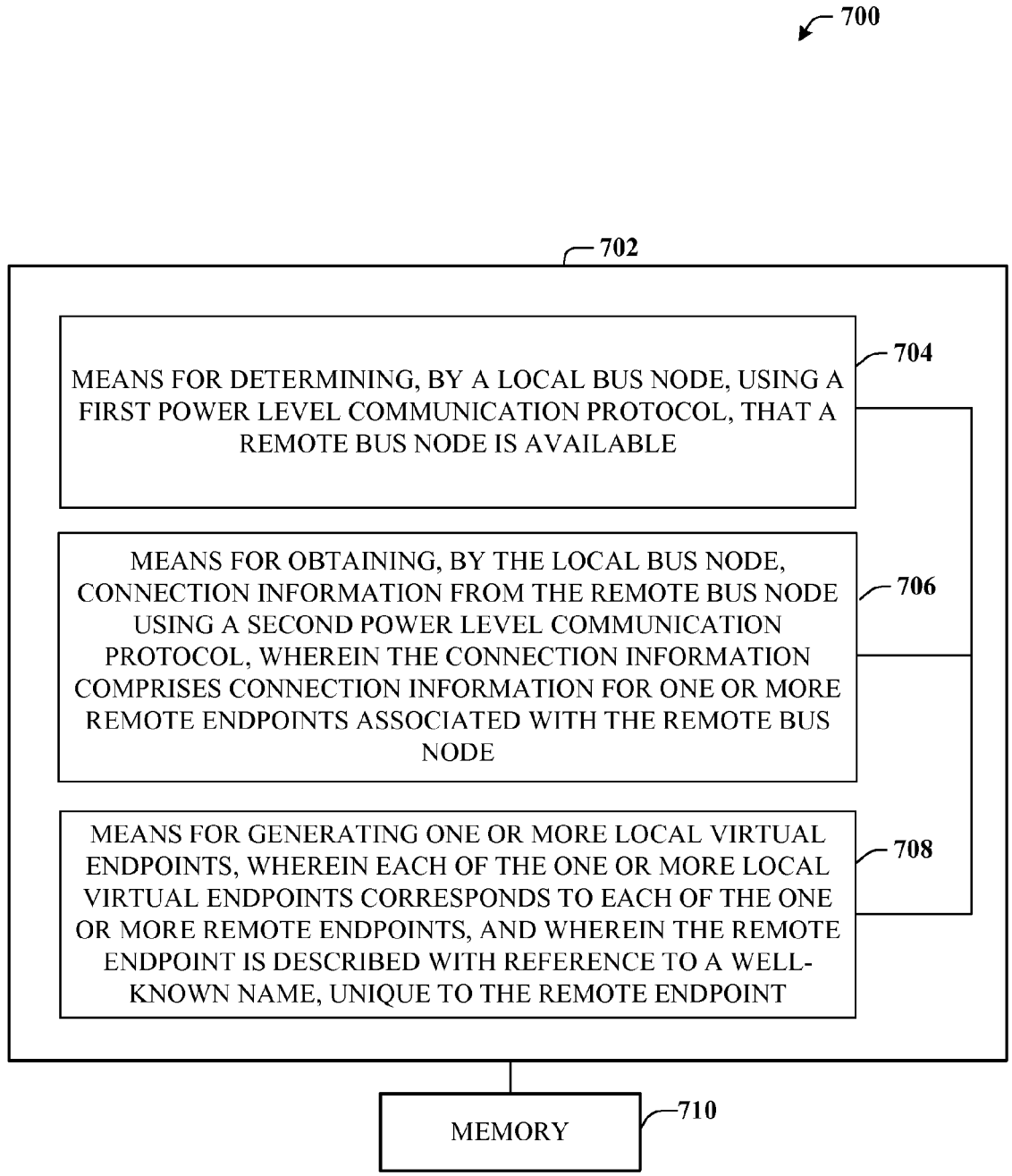
FIG. 7 Illustrates a block diagram of an exemplary communication system that can use an ad hoc peer-to-peer distributed message bus, according to yet another aspect

With reference to FIG. 7, illustrated is a system 700 for using an ad hoc peer-to-peer distributed message bus, according to one aspect. For example, system 700 can reside at least partially within a WCD, UE, etc. According to another exemplary aspect, system 700 can reside at least partially within an access terminal. It is to be appreciated that system 700 is represented as including functional blocks, which can be functional blocks that represent functions implemented by a processor, software, or combination thereof (e.g., firmware).

System 700 includes a logical grouping 702 of means that can act in conjunction. For instance, logical grouping 702 can include means for determining, by a local bus node, using a first power level communication protocol, that a remote bus node is available 704. In one aspect, the second power level communication protocol may use a greater amount of power than the first power level communication protocol. Accordingly, the second power level communication protocol may allow for higher data rates to be used than the first power level communication protocol. Further, logical grouping 702 can include means for obtaining, by the local bus node, connection information from the remote bus node using a second power level communication protocol, wherein the connection information comprises connection information for one or more remote endpoints associated with the remote bus node 706. In one aspect, the means for obtaining may include means for transmitting a connection request automatically in response to the determination that the remote bus node is available, and means for receiving the connection information in response to the transmitted request.

Further, logical grouping 702 can comprise means for generating one or more local virtual endpoints, wherein each of the one or more local virtual endpoints corresponds to each of the one or more remote endpoints, and wherein the remote endpoint is described with reference to a well-known name, unique to the remote endpoint 708. In one aspect, the well known name further may include a first portion of the well known name describing the remote bus node and a second portion of the well known name describing the remote endpoint. In another aspect, the well known name may include a transport type and one or more connection parameters. In one such aspect, the transport type may include at least one of a Bluetooth based transport protocol, a UNIX based transport protocol, a TCP based transport protocol, a universal serial bus based transport protocol, etc. For example, where the transport type is a TCP based transport protocol, the one or more connection parameters may include optimized one hop routing to the remote bus node associated with the remote endpoint. As other example, where the transport type is a Bluetooth based transport protocol, the one or more connection parameters may include optimized connection information for a single pico net structure.

Additionally, system 700 can include a memory 710 that retains instructions for executing functions associated with the means 704, 706 and 708. While shown as being external to memory 710, it is to be understood that one or more of the means 704, 706 and 708 can exist within memory 710.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored as one or more instructions or code on a non-transitory computer-readable medium. Computer-readable media includes both computer storage media that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by computer. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of facilitating endpoint communications, comprising:

connecting a first peer communication device to a second peer communication device over a first wireless physical layer connection, through a discovery mechanism, between the first and second peer communication devices, wherein the first wireless physical layer connection operates according to a first power level physical transport type;

determining, by a local bus node on the first peer communication device, over the first wireless physical layer connection, that a remote bus node is available on the second peer communication device;

authenticating the remote bus node, through an authentication mechanism;

obtaining, by the local bus node, over a second wireless physical layer connection between the first and second peer communication devices, connection information from the remote bus node, wherein the second wireless physical layer connection operates according to using a second power level physical transport type that uses a greater amount of power than the first power level physical transport type, wherein the connection information comprises connection information for one or more remote endpoints associated with the remote bus node, wherein the remote endpoint corresponds to a peer-to-peer application; and generating one or more local virtual endpoints, wherein each of the one or more local virtual endpoints corresponds to each of the one or more remote endpoints, and wherein the remote endpoint is described with reference to a well-known name unique to the remote endpoint, and wherein a first portion of the well-known name describes the remote bus node and a second portion of the well-known name describes the remote endpoint.

2. The method of claim 1, wherein the well-known name further comprises a first portion of the well-known name describing the remote bus node and a second portion of the well-known name describing the remote endpoint.

3. The method of claim 1, wherein the well-known name further comprises a transport type and one or more connection parameters.

4. The method of claim 3, wherein the transport type is selected from the group consisting of:
   a Bluetooth based transport protocol;
   a UNIX based transport protocol;
   a TCP based transport protocol; and
   a universal serial bus based transport protocol.

5. The method of claim 3, wherein the transport type is a Bluetooth based transport protocol, and the one or more connection parameters comprise optimized connection information for a single pico net structure.

6. The method of claim 3, wherein the transport type is a TCP based transport protocol, and the one or more connection parameters comprise optimized one hop routing to the remote bus node associated with the remote endpoint.

7. The method of claim 1, wherein the obtaining further comprises:
   transmitting a connection request automatically in response to the determination that the remote bus node is available; and
   receiving the connection information in response to the transmitted request.

8. The method of claim 1, further comprising:
   receiving, by the local bus node, a request from a local endpoint to communicate with at least one of the one or more local virtual endpoints;
   transmitting the request to the at least one of the one or more corresponding remote endpoints;
   receiving an access message from the at least one of the one or more corresponding remote endpoints granting the local endpoint access to the remote endpoint; and
   establishing a communication session between the local endpoint and the remote endpoint in response to the access message.

9. The method of claim 8, wherein the establishing comprises using the second power level physical transport type.

10. A non-transitory computer-readable storage medium having stored thereon computer-executable instruction configured to cause a processor to perform operations comprising:
    connecting a first peer communication device to a second peer communication device over a first wireless physical layer connection, through a discovery mechanism, between the first and second peer communication devices, wherein the first wireless physical layer connection operates according to a first power level physical transport type;
    determining, by a local bus node on the first peer communication device, over the first wireless physical layer connection, that a remote bus node is available on the second peer communication device;
    authenticating the remote bus node, through an authentication mechanism;
    obtaining, by the local bus node, over a second wireless physical layer connection between the first and second peer communication devices, connection information from the remote bus node, wherein the second wireless physical layer connection operates according to using a second power level physical transport type that uses a greater amount of power than the first power level physical transport type, wherein the connection information comprises connection information for one or more remote endpoints associated with the remote bus node, wherein the remote endpoint corresponds to a peer-to-peer application; and
    generating one or more local virtual endpoints, wherein each of the one or more local virtual endpoints corresponds to each of the one or more remote endpoints, and wherein the remote endpoint is described with reference to a well-known name unique to the remote endpoint, and wherein a first portion of the well-known name describes the remote bus node and a second portion of the well-known name describes the remote endpoint.

11. The non-transitory computer-readable storage medium of claim 10, wherein the stored computer-executable instructions are configured to cause the processor to perform operations such that the well-known name further comprises a first portion of the well-known name describing the remote bus node and a second portion of the well-known name describing the remote endpoint.

12. The non-transitory computer-readable storage medium of claim 10, wherein the stored computer-executable instructions are configured to cause the processor to perform operations such that the well-known name further comprises a transport type and one or more connection parameters.

13. The non-transitory computer-readable storage medium of claim 12, wherein the stored computer-executable instructions are configured to cause the processor to perform operations such that the transport type is selected from the group consisting of:
    a Bluetooth based transport protocol;
    a UNIX based transport protocol;
    a TCP based transport protocol; and
    a universal serial bus based transport protocol.

14. The non-transitory computer-readable storage medium of claim 12, wherein the stored computer-executable instructions are configured to cause the processor to perform operations such that the transport type is a Bluetooth based transport protocol, and the one or more connection parameters comprise optimized connection information for a single pico net structure.

15. The non-transitory computer-readable storage medium of claim 12, wherein the stored computer-executable instructions are configured to cause the processor to perform operations such that the transport type is a TCP based transport protocol, and the one or more connection parameters comprise optimized one hop routing to the remote bus node associated with the remote endpoint.

16. The non-transitory computer-readable storage medium of claim 10, wherein the stored computer-executable instructions are configured to cause the processor to perform operations further comprising:
    transmitting a connection request automatically in response to the determination that the remote bus node is available; and
    receiving the connection information in response to the transmitted request.

17. The non-transitory computer-readable storage medium of claim 10, wherein the stored computer-executable instructions are configured to cause the processor to perform operations further comprising:
    receiving, by the local bus node, a request from a local endpoint to communicate with at least one of the one or more local virtual endpoints;

transmitting the request to the at least one of the one or more corresponding remote endpoints;

receiving an access message from the at least one of the one or more corresponding remote endpoints granting the local endpoint access to the remote endpoint; and establishing a communication session between the local endpoint and the remote endpoint in response to the access message.

18. An apparatus for facilitating endpoint communications, comprising:

means for connecting a first peer communication device to a second communication device over a first wireless physical layer connection, through a discovery mechanism, between the first and second communication devices, wherein the first wireless physical layer connection operates according to a first power level physical transport type;

means for determining, by a local bus node on the first peer communication device, over the first wireless physical layer connection, that a remote bus node is available on the second peer communication device;

means for authenticating the remote bus node, through an authentication mechanism;

means for obtaining, by the local bus node, over a second wireless physical layer connection between the first and second peer communication devices, connection information from the remote bus node, wherein the second wireless physical layer connection operates according to using a second power level physical transport type that uses a greater amount of power than the first power level physical transport type, wherein the connection information comprises connection information for one or more remote endpoints associated with the remote bus node, wherein the remote endpoint corresponds to a peer-to-peer application; and means for generating one or more local virtual endpoints, wherein each of the one or more local virtual endpoints corresponds to each of the one or more remote endpoints, and wherein the remote endpoint is described with reference to a well-known name unique to the remote endpoint, and wherein a first portion of the well-known name describes the remote bus node and a second portion of the well-known name describes the remote endpoint.

19. The apparatus of claim 18, wherein the well-known name further comprises a first portion of the well-known name describing the remote bus node and a second portion of the well-known name describing the remote endpoint.

20. The apparatus of claim 18, wherein the well-known name further comprises a transport type and one or more connection parameters.

21. The apparatus of claim 20, wherein the transport type is selected from the group consisting of:
a Bluetooth based transport protocol;
a UNIX based transport protocol;
a TCP based transport protocol; and
a universal serial bus based transport protocol.

22. The apparatus of claim 20, wherein the transport type is a Bluetooth based transport protocol, and the one or more connection parameters comprise optimized connection information for a single pico net structure.

23. The apparatus of claim 20, wherein the transport type is a TCP based transport protocol, and the one or more connection parameters comprise optimized one hop routing to the remote bus node associated with the remote endpoint.

24. The apparatus of claim 18, wherein the means for obtaining further comprises:

means for transmitting a connection request automatically in response to the determination that the remote bus node is available; and means for receiving the connection information in response to the transmitted request.

25. The apparatus of claim 18, further comprising:

means for receiving, by the local bus node, a request from a local endpoint to communicate with at least one of the one or more local virtual endpoints;

means for transmitting the request to the at least one of the one or more corresponding remote endpoints;

means for receiving an access message from the at least one of the one or more corresponding remote endpoints granting the local endpoint access to the remote endpoint; and means for establishing a communication session between the local endpoint and the remote endpoint in response to the access message.

26. The apparatus of claim 25, wherein the establishing comprises using the second power level physical transport type.

27. An apparatus for facilitating endpoint communications, comprising:

a communication module operable for:

connecting a first peer communication device to a second peer communication device over a first wireless physical layer connection, through a discovery mechanism, between the first and second peer communication devices, wherein the first wireless physical layer connection operates according to a first power level physical transport type;

determining, by a local bus node on the first peer communication device, over the first wireless physical layer connection, that a remote bus node is available on the second peer communication device;

authenticating the remote bus node, through an authentication mechanism;

obtaining, by the local bus node, over a second wireless physical layer connection between the first and second peer communication devices, connection information from the remote bus node, wherein the second wireless physical layer connection operates according to using a second power level physical transport type that uses a greater amount of power than the first power level physical transport type, wherein the connection information comprises connection information for one or more remote endpoints associated with the remote bus node, wherein the remote endpoint corresponds to a peer-to-peer application; and generating one or more local virtual endpoints, wherein each of the one or more local virtual endpoints corresponds to each of the one or more remote endpoints, and wherein the remote endpoint is described with reference to a well-known name unique to the remote endpoint, and wherein a first portion of the well-known name describes the remote bus node and a second portion of the well-known name describes the remote endpoint.

28. The apparatus of claim 27, wherein the well-known name further comprises a first portion of the well-known name describing the remote bus node and a second portion of the well-known name describing the remote endpoint.

29. The apparatus of claim 27, wherein the well-known name further comprises a transport type and one or more connection parameters.

30. The apparatus of claim 29, wherein the transport type is selected from the group consisting of:
- a Bluetooth based transport protocol;
- a UNIX based transport protocol;
- a TCP based transport protocol; and
- a universal serial bus based transport protocol.

31. The apparatus of claim 29, wherein the transport type is a Bluetooth based transport protocol, and the one or more connection parameters comprise optimized connection information for a single pico net structure.

32. The apparatus of claim 29, wherein the transport type is a TCP based transport protocol, and the one or more connection parameters comprise optimized one hop routing to the remote bus node associated with the remote endpoint.

33. The apparatus of claim 27, further comprising a transceiver operable for:
- transmitting a connection request automatically in response to the determination that the remote bus node is available; and
- receiving the connection information in response to the transmitted request.

34. The apparatus of claim 27, further comprising a transceiver operable for:
- receiving, by the local bus node, a request from a local endpoint to communicate with at least one of the one or more local virtual endpoints;
- transmitting the request to the at least one of the one or more corresponding remote endpoints; and
- receiving an access message from the at least one of the one or more corresponding remote endpoints granting the local endpoint access to the remote endpoint, wherein the communication module is further operable for establishing a communication session between the local endpoint and the remote endpoint in response to the access message.

35. The apparatus of claim 34, wherein the communication module is further operable for using the second power level physical transport type.

\* \* \* \* \*